United States Patent
Fischperer

(10) Patent No.: US 6,411,049 B1
(45) Date of Patent: Jun. 25, 2002

(54) METHOD AND APPARATUS FOR OPERATING A MAGNET VEHICLE

(75) Inventor: Rolf Fischperer, Berlin (DE)

(73) Assignee: Transrapid International GmbH & Co. KG, Berlin (DE)

( * ) Notice: Subject to any disclaimer, the term of this patent is extended or adjusted under 35 U.S.C. 154(b) by 0 days.

(21) Appl. No.: 09/564,757

(22) Filed: May 4, 2000

(30) Foreign Application Priority Data

May 7, 1999 (DE) .......................................... 199 22 441

(51) Int. Cl.[7] .............................. B60L 9/00; H02K 41/00
(52) U.S. Cl. ............................ 318/38; 310/12; 104/292; 318/135
(58) Field of Search ............................ 310/12, 13, 14; 318/38, 135; 104/292

(56) References Cited

U.S. PATENT DOCUMENTS 4,454,457 A * 6/1984 Nakamura et al. ........... 318/135
4,955,303 A * 9/1990 Ikeda ....................... 318/35 X
4,985,651 A * 1/1991 Chitayat ...................... 310/12

FOREIGN PATENT DOCUMENTS

| DE | 29 32 764 A1 | 3/1981 |
| DE | 33 03 961 A1 | 8/1983 |
| DE | 39 17 058 C1 | 11/1990 |

OTHER PUBLICATIONS

Juergen Meins: "Energieversorgung des Langstatorantriebs", ETZ BD. 108 (1987), Heft 9, pp. 378–381.

* cited by examiner

Primary Examiner—Nestor Ramirez
Assistant Examiner—Judson H. Jones
(74) Attorney, Agent, or Firm—Michael J. Striker

(57) ABSTRACT

A method and an apparatus for operating a magnetically levitated magnet vehicle (5) are described, with a synchronous long stator linear motor, which comprises a plurality of winding sections (3.1 3.5) arranged one after the other in the direction of travel (x) and connected one after the other to a track cable (9) in accordance with the progress of the magnet vehicle (5). In accordance with the invention, on passing a changeover point (22.1–22.4), at least the two winding sections (e.g. 3.2, 3.3) adjoining the changeover point are connected electrically in series (FIG. 3c).

12 Claims, 8 Drawing Sheets

(a)

(b)

(c)

(d)

(e)

(f)

(a)

(b)

(c)

(d)

(e)

(f)

(a)

(b)

(c)

(d)

(a)

(b)

(c)

(d)

(a)

(b)

(c)

(d)

METHOD AND APPARATUS FOR OPERATING A MAGNET VEHICLE

BACKGROUND OF THE INVENTION

1. Field of the Invention

This invention relates to a method and an apparatus for operating a magnetic vehicle with a long stator linear motor.

More particularly, the invention concerns a method, in which winding sections of the long stator arranged one after the other in the direction of a track and isolated electrically from one another by changeover points are connected in sequence in accordance with the progress of the magnet vehicle to a track cable serving for the current supply, and an apparatus which comprises at least one track cable extending in the direction of the track for supplying the winding sections with current, at least on substation connected to the track cable and first switching devices for sequential connection of the winding sections to the track cable in accordance with the progress of the vehicle.

2. Description of the Prior Art

In linear motors for magnet vehicles, especially in synchronous long stator linear motors for magnetically levitated vehicles, the stator winding is usually sub-divided into many short winding sections, e.g. only about 1.2 km long, lying directly one after the other in the direction of travel and electrically isolated from one another by changeover points. Moreover a comparatively long track cable, e.g. about 40 km, is laid parallel to the track and is connected to a so-called substation, in which the converters or the like required for the current supply to the stator winding are installed. In order to limit the power consumption only that winding section in which the vehicle is actually present is supplied with current, in that the individual winding sections are connected individually and sequentially to the track cable with the aid of switching devices, in accordance with the progress of the vehicle.

One problem with this control, known as the short-circuit method, of the current supply controlling the speed of the vehicle is that only one of the two winding sections adjoining a changeover point can be connected at a time to the track cable when traversing this point, since otherwise the current flow in the winding sections can no longer be controlled and the vehicle acts on the current in a manner corresponding to a short-circuit. A result of this is that there is a temporary alteration in the active vehicle length at each section change and hence a reduction in the propulsive force, which amounts to at least 50% and affects the comfort of the ride.

In order to avoid such slumps in the propulsive force many methods and apparatuses have already been proposed (e.g. offprint of etz Vol. 108, 1987, issue 9, pages 1–24, DE 3 917 058 A1), which are known under catchwords such as "leapfrog method", "alternate step method", "double feed", "position dependent current distribution" or the like. A feature common to all these methods and apparatuses is however that, when passing a changeover point, either only the one or the other participating winding section is fed with current and therefore only part of the vehicle motor is active. On account of this dependence of the active part of the vehicle motor on the vehicle position in the region of the changeover points, slumps in the propulsive force could previously only be avoided in that either the power installed in the substations was over-dimensioned, in order to meet the increased demand when passing a changeover point, or separate supply systems with at least two track cable were provided.

In contrast to this it is an object of this invention to modify the method and the apparatus mentioned above such that the whole vehicle motor can always remain active in the region of the changeover points.

A further object of the invention is to design the method and the apparatus such that stator section changeovers are possible substantially without slumps in the propulsive force of the long stator motor.

Yet another object of this invention is to create new possiblities for effecting smooth changeovers of a magnetic vehicle, particularly a magnetically levitated vehicle from one long stator section to a following long stator section.

These and other objects of the invention are solved by a method which is characterized in that, before traversing any changeover point, in each case a first winding section connected to the track cable and a second winding section separated therefrom by the changeover point are connected together in an electrical series circuit and remain connected until after the changeover point has been traversed.

An apparatus according to this invention is characterized by switching devices through which two winding sections lying directly after one another in the direction of travel can be connected electrically together.

The invention provides the advantage that the two winding section involved at a changeover point are always connected in series circuit during the section change and are traversed by the same current. Accordingly, on the one hand the position of the vehicle relative to the changeover points has practically no significance, on the other hand numerous novel possibilities for the current supply when passing a changeover point result.

Further advantageons features of the invention appear from the dependent claims.

BRIEF DESCRIPTION OF THE DRAWINGS

The invention will now be explained in more detail in conjunction with the accompanying drawings of an embodiment of a magnetically levitated railroad with a long stator linear motor, where in.

DETAILED DESCRIPTION OF THE INVENTION

Figure 1:
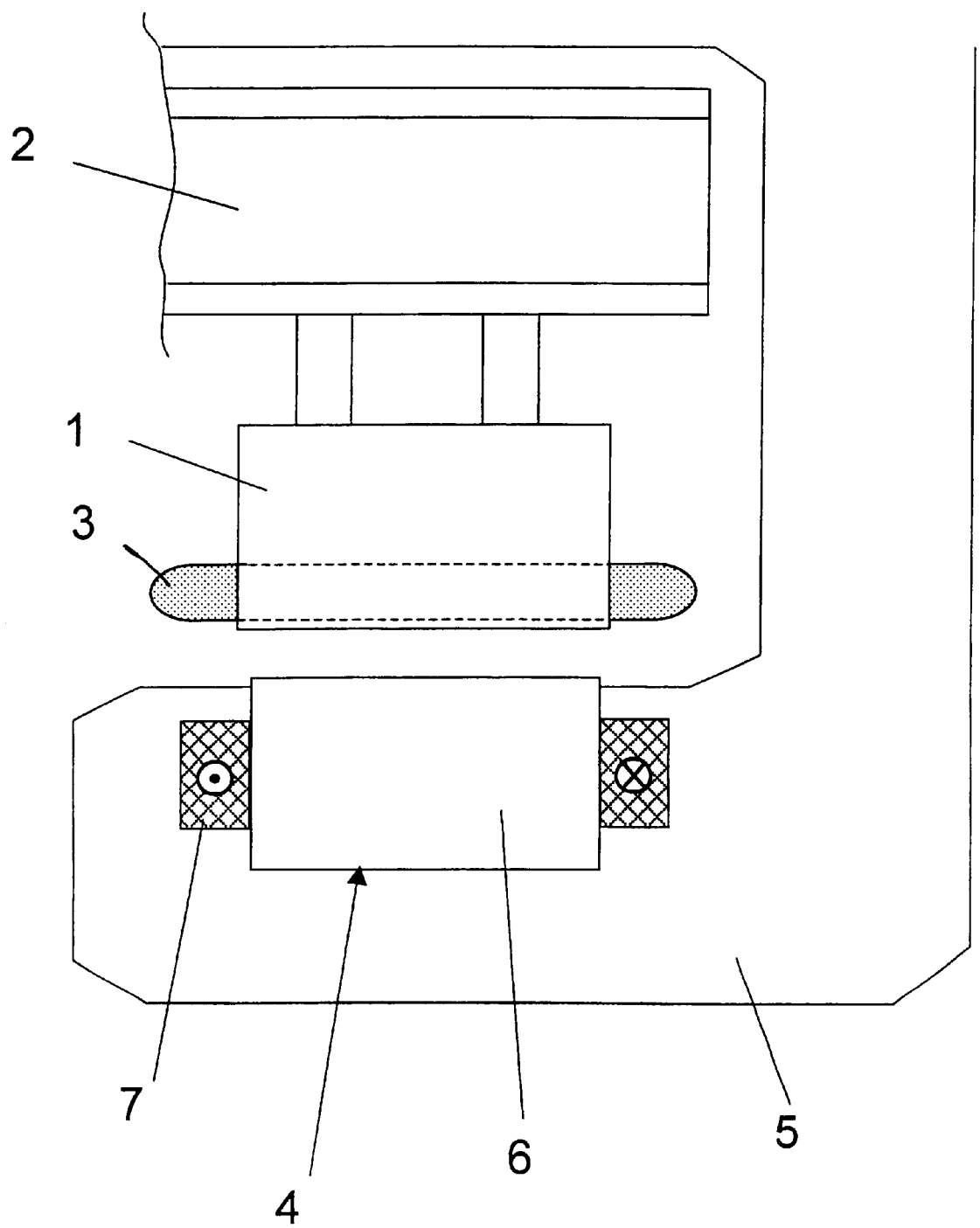
FIG. 1 ist a schematic cross-section through a magnetically levitated vehicle and its track.

In a magnetically levitated railroad with a synchronous long stator (FIG. 1) a stator lamination pack 1, i.e. a stack of sheets is fixed in position on a track 2 set up along a predetermined route. A long stator winding 3 in the form of a polyphase (three-phase) winding is disposed in the grooves of the stator lamination pack 1 and is supplied from a converter with polyphase current of variable amplitude and frequency, whereby a travelling current surface wave is formed along the long stator motor in known manner. The exciting field of the long stator synchronous machine is created by support magnets 4, which each consist of a magnet core 6 and an exciting winding 7 and are attached to a vehicle 5, indicated only schematically in FIG. 1, which moves along the track. As well as providing the function of magnetic support the support magnets 4 provide at the same time the exciting field of the synchronous machine. As a rule a stator lamination pack 1 is provided on each of the two sides of the track 2, with the associated, normally three-phase longitudinal stator winding 3 and a plurality of support magnets 4 in each case.

In order to provide the desired driving force it is necessary for the vehicle speed to be synchronous with the speed of propagation of the current surface wave or propulsion travelling field. The maximum drive or propulsive force arises at a given amplitude of the fundamental converter wave when an optimum position of the vehicle exciting field is maintained relative to the converter wave, which would correspond in a synchronous polyphase motor to maintaining the optimum rotor displacement angle. This is achieved by frequency regulation of the inverter, the instantaneous vehicle speed and the position of the support magnet 4 relative to the phase R for example of the longitudinal stator winding 3 being used as reference values.

Figure 2:
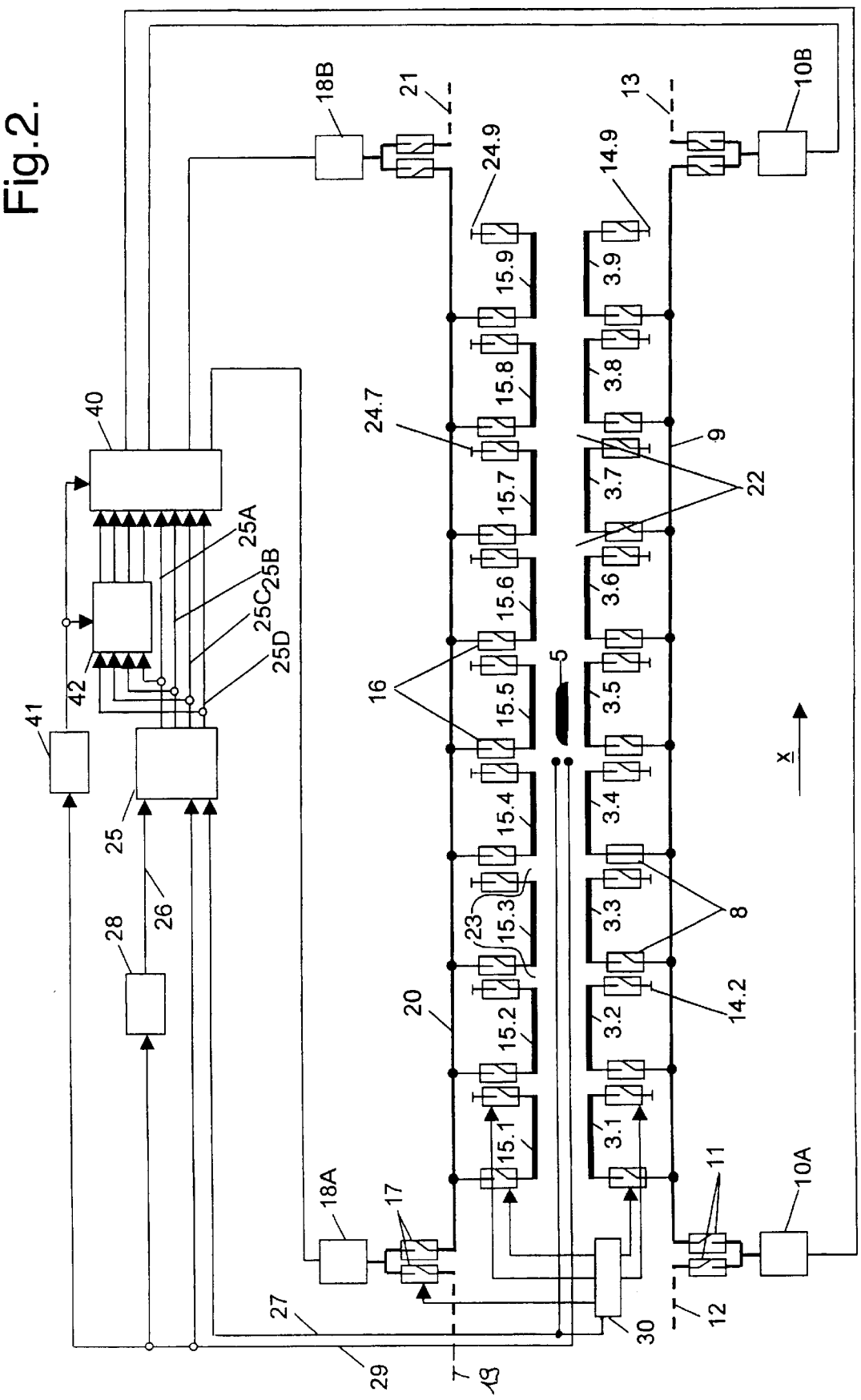
FIG. 2 shows an apparatus according to the invention schematically, for operating a magnetically levitated vehicle.

In order to minimise the demand for reactive power and voltage of the longitudinal stator motor only that portion of the longitudinal stator winding 3 (FIG. 2) is activated which is traversed directly by the vehicle 5 moving e.g. in the direction of the track (arrow x). To this end the longitudinal stator winding 3 is divided, as FIG. 2 shows only schematically, into a plurality of winding sections 3.1 to 3.9 directly following one another in the longitudinal direction of the track, these being adapted to be connected to the track cable 9 by respective associated switch devices 8. In FIG. 2 this applies just to the winding section 3.4. The ends of the track cable 9 are each connected to a substation 10A, 10B respectively (double feed), in which are installed the devices required to feed the current into the winding sections 3.1 to 3.9, especially converters or the like. The substations 10A, 10B can be connected by means of further switching devices 11 to respective further track cables 12 and 13 further along the track, when the vehicle 5 has not yet been driven into the section of the track defined by the substations 10A, B or the track cable 9 or has left this.

In fact the long stator winding 3 does not consist only of the winding sections 3.1 to 3.9 but also of further, corresponding winding sections which are connected e.g. to the winding sections 3.1 to 3.9 in star circuits with star points 14.1, 14.2, etc., in order to achieve the usual polyphase system with phases R, S and T. Since these additional winding sections are not necessary to an understanding of the invention, they are not shown in FIG. 2 to simplify the view.

The winding sections 3.1 to 3.9 shown in FIG. 2 serve as a rule to drive only one side, the right side for example, of the vehicle 5. Corresponding winding sections 15.1, 15.2, switching devices 16 and 17, substations 18A, B and track cables 19, 20 and 21 serve to drive the left side of the vehicle in corresponding manner. The winding sections 3.1 to 3.9 are preferably offset in the x-direction by at least one vehicle length relative to the winding sections 15.1 to 15.9, in order to facilitate use of the so-called alternate step method. This consists in that the switching devices 8 or 16 are always actuated when a changeover point 22 or 23 between two winding sections arranged one after the other is located approximately in the middle of the vehicle. In practice the corresponding substations 10A, 18A and 10B, 18B are combined in each case in a single unit arranged on the track. The winding sections 15.1 to 15.9 lead to star points 24.1 to 24.9.

In order to control the described magnetically levitated railroad there serves a speed or current regulator 25, to which a set-point (nominal) value for the speed of the vehicle 5 to be attained or maintained is fed over a line 26 and a current location signal transmitted from the vehicle by radio for example is fed over a line 27. The set-point values for the speed are entered in a set-point memory 28, to which is also applied the location signal and which provides the predetermined speed or current set-point value for the currently traversed winding section.

The current regulator 25, to which the location signal is also fed via the line 27, supplies set-point values at outputs 25A, 25B, which consist of voltage set-point values for example and are fed to the substations 10A, 10B, in order to establish in these the voltages to be applied to the track cables or the currents which need to be supplied to achieve the nominal speed. Further outputs 25C, 25D supply corresponding signals for the substations 18A, B. The speed regulator 25 checks the maintenance of the prescribed nominal speed by means of the actual speed signal detected by the vehicle 5, which appears on a line 29. Current regulation could take place instead of voltage regulation in the substations. The blocks connected to the output 25A in FIG. 2 are explained further below.

Finally, a control device 30 connected to the line 27 is shown in FIG. 2, by means of which the various switching devices 8, 11, 16 and 17 are so controlled in dependence on the actual position of the vehicle 5 in the x-direction that on the one hand only the currently traversed winding sections and the associated substations are connected to the various track cables and on the other hand the various winding sections are connected together in a manner characteristic of the invention, as is explained in more detail below.

Apparatuses of the kind described and their function are generally known from the references DE OS 2 932 764 A1, DE 3 303 961 A1, DE 3 917 058 A1 and the offprint from etz, vol. 108, 1987, issue 9, pages 1–24, which are accordingly incorporated by reference into the subject matter of the present disclosure, in order to avoid repetition.

Figure 3:
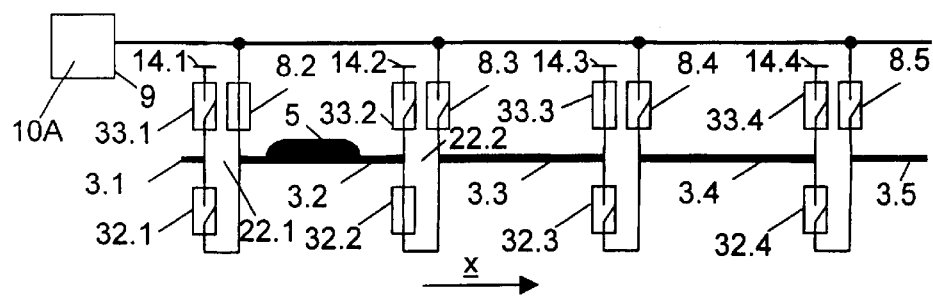
FIGS. 3 to 8 show very schematically the performance of the method according to the invention with reference to serveral embodiments of the apparatus according to the invention.
Figure 3:
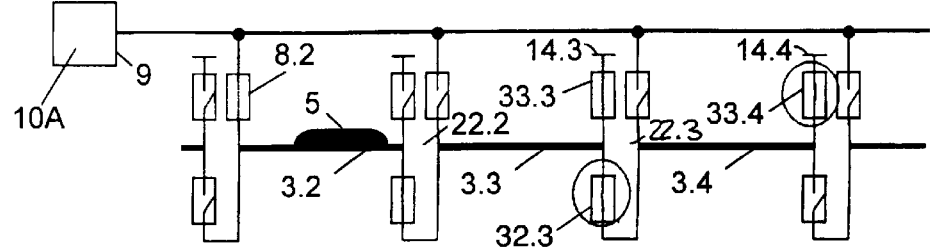
Figure 3:
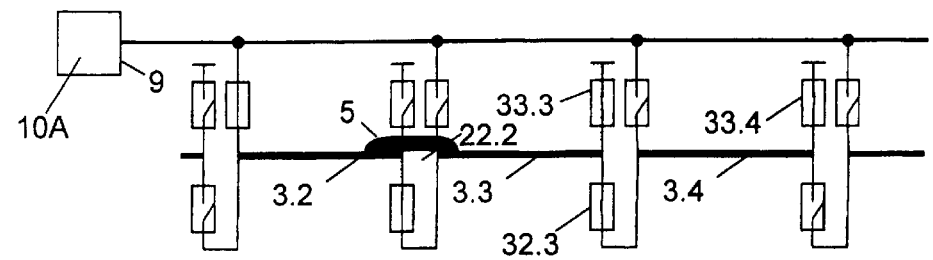
Figure 3:
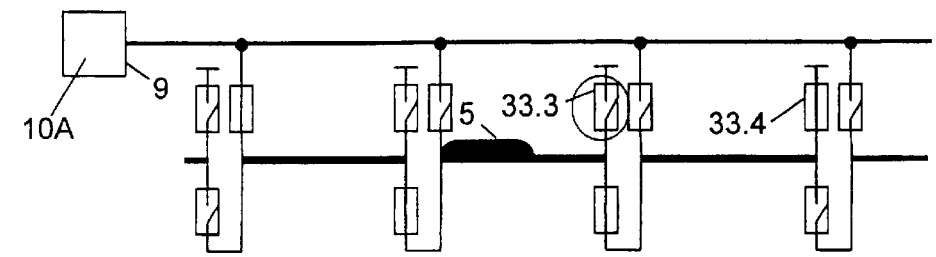
Figure 3:
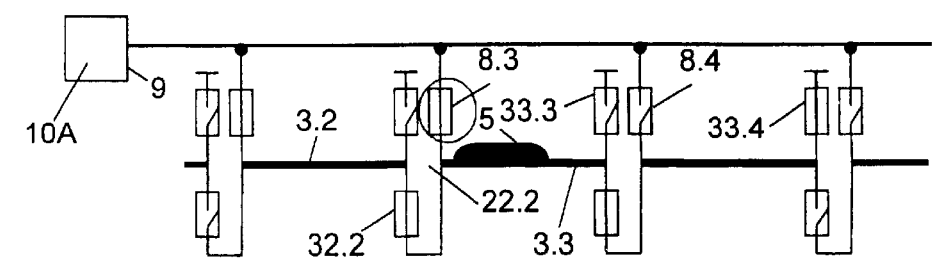
Figure 3:
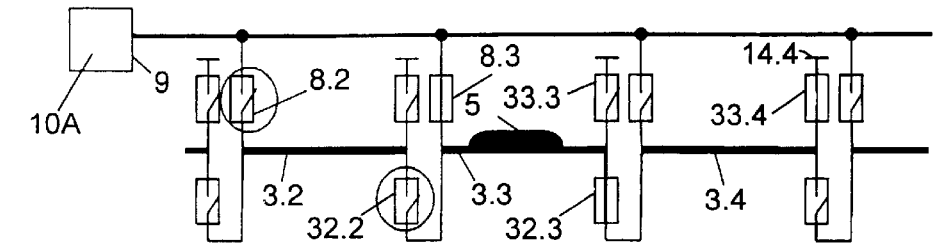

FIG. 3 shows schematically the embodiment of the invention so far considered the best, wherein however—in order to simplify the understanding—there are shown only the vehicle 5, the winding sections 3.1 to 3.5 drawn in thick lines, connected to first switching devices 8.2 to 8.5 acting as feed switches associated with the start—in the direction of travel x—of an associated winding section, and the track cable 9, which is here connected only to the substation 10A for single feed supply. The individual winding sections 3.1 to 3.5 are electrically isolated from one another by respective schematically indicated changeover points 22.1 to 22.4. In an initial state according to FIG. 3*a* only the switching device 8.2 is closed. The control device 30 (FIG. 2) is not shown again in FIG. 3.

In accordance with the invention second switching device 32.1 to 32.4 are provided in FIG. 3, which can also be called extension switches, since two winding sections directly following one another in the direction of travel x can be connected electrically to one another through them, as applies in FIG. 3*a* to the winding sections 3.2 and 3.3. The other winding sections are not connected in an electrical series circuit, since only the switching device 32.2 is closed.

In FIG. 3 third switching devices 33.1 to 33.4 are further provided and can also be called star point switches, since the ends of the winding sections 3.1 to 3.4 can be connected through them to the associated star points 14.1 to 14.4. This applies in FIG. 3*a* for the winding section 3.3 while all other star points 14 are open.

In use of the apparatus according to FIG. 3 the following method is preferably used in accordance with the invention:

Starting from the initial state according to FIG. 3a, in which the switching devices 8.2, 32.2 and 33.3 are in the closed state, there is a current path from the track cable 9 to the winding section 3.2, thence through the switching device 32.2 and to the next winding section 3.3, while bridging the changeover point 22.2, and thence finally to the star point 14.3. The winding sections 3.2 and 3.3 are thus connected electrically in series. The vehicle 5 is in the winding section 3.2.

When the vehicle 5 approaches the changeover point 22.2 (FIG. 3b), the second and third switching devices 32.2 and 33.4 are also closed, as is indicated in FIG. 3b by circles. Accordingly the winding sections 3.3 and 3.4 following one another are also connected electrically in series, bridging the changeover point 22.3, although this series circuit initially remains largely ineffective on account of the still closed third switching device 33.3, since the winding section 3.4 has a substantially larger impedance than the line leading to the star point 14.3.

The vehicle 5 subsequently passes the changeover point 22.2 (FIG. 3c), while yet the whole vehicle motor remains permanently active, because the two winding sections 3.2 and 3.3 in question are carrying current.

After the vehicle 5 has passed the changeover point 22.2 completely (FIG. 3d), the circled third switching device 33.3 is opened, whereby the series circuit formed by the three winding sections 3.2, 3.3 and 3.4 is fully effective.

In the next step (FIG. 3e) the first switching device 8.3 is closed, in order thereby to connect the start of the winding section 3.3 directly to the track cable 9, whereby part of the current also flows for a time through the winding section 3.2. The proportion of current which flows through the track cable 9 to the winding section 3.3 is substantially greater than the component flowing through the winding section 3.2 on account of the comparatively small impedance of the track cable 9. The vehicle 5 is still in the winding section 3.3.

Finally, in the last method step (FIG. 3f) the first switching device 8.2 and the second switching device 32.2 are opened. Accordingly the series circuit of the winding sections 3.2 and 3.3 is interrupted. The vehicle 5 is still in the winding section 3.3. Accordingly, in the final state according to FIG. 3f the same state is produced in relation to the winding sections 3.3 and 3.4 as is shown in FIG. 3a for the winding section 3.2 and 3.3.

During the further passage of the vehicle 5 the described method steps repeat themselves correspondingly. Accordingly either two or three winding sections lying one after the other in the direction of travel are connected in series, depending on the settings of the switching devices 8, 32 and 33, with the consequence that there are corresponding alterations in the sum of the impedances arising in the participating winding and track cable sections. If all winding sections have the same impedance and if the impedance components of the track cable are small, the change in impedance is about 33% in each case, which involves a corresponding drop of current or a corresponding increase in current.

The switching devices described in FIG. 3 for the phase R for example are correspondingly present for the other two phases.

Since the current or propulsive force variations which are caused by an impedance variation of 33% do not even amount to 33% but are smaller, the propulsive force variations in the region of the changeover points are as a whole relatively small, so that they can easily be compensated for by correspondingly slight over-dimensioning of the substation 10A. In any case it is advantageous that no interruption of the current occurs in the region of the changeover points 22, the whole vehicle engine always remains active and only one track cable 9 and one substation 10A are needed, in order to achieve similar changes of state on passing a changeover point to those previously only obtainable by use of the known leapfrog or alternate step method and therefore only with the aid of two track cables and two substations. On the basis of the switching sequence for the winding sections seen from FIG. 3 and characteristic of the invention, the method according to the invention is called the partial step method.

Figure 4:
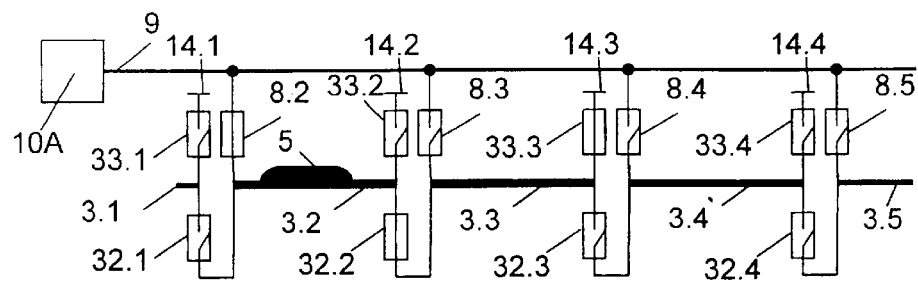
Figure 4:
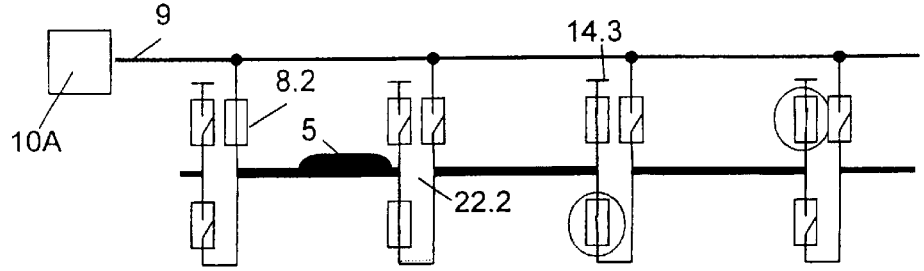
Figure 4:
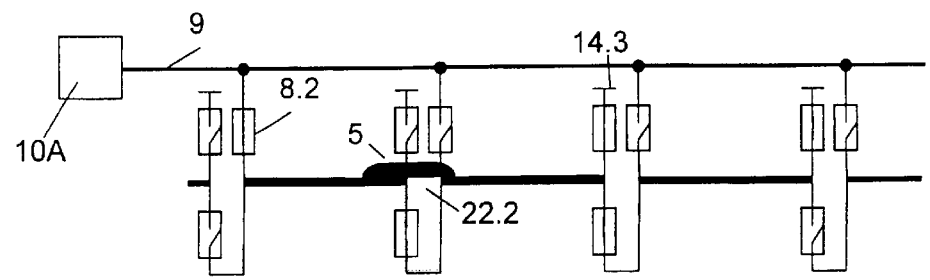
Figure 4:
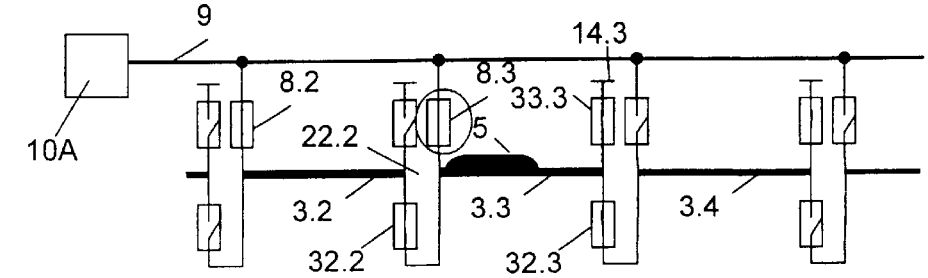
Figure 4:
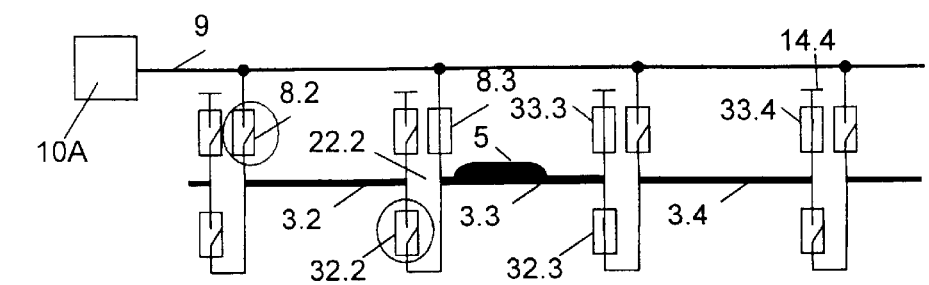
Figure 4:
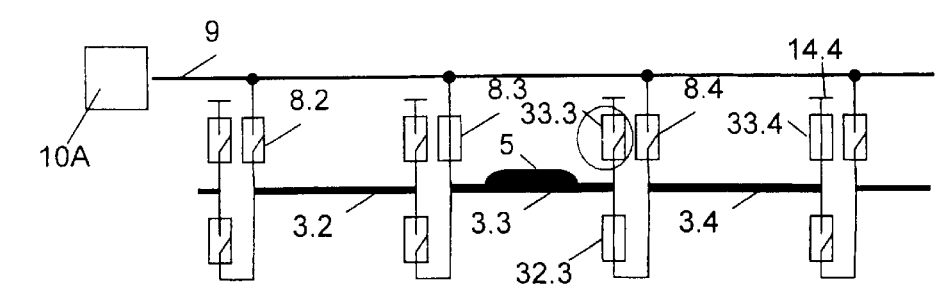

If a sufficiently high power (in particular voltage) can be installed in the substations 10A, which is no problem with the small speeds of travel occurring in regional traffic, on account of the overall small power requirements, it is possible to switch in series at the most two winding sections arranged one after the other in the direction of travel x, in accordance with FIG. 4, in which the same references as in FIG. 3 are applied.

FIGS. 4a to 4c correspond to FIGS. 3a to 3c, wherein the winding section 3.4 has hardly any effect on the total impedance of the series circuit formed by the winding sections 3.2 and 3.3, on account of the closed star point 14.3, as in FIG. 3.

When the vehicle 5 has passed the changeover point 22.2 corresponding to FIG. 4d, in this embodiment the circuit device 8.3 is closed, differing from FIG. 3d, so that the winding section 3.2 still switched in is practically bridged over. The current here flows practically solely through the winding section 3.3, on account of the small impedance of the switched in track cable section. In subsequent travel of the vehicle 5 the switching devices 8.2 and 32.2 are firstly opened (FIG. 4e), whereby the winding section 3.2 is isolated from the series circuit. The winding section 33.3 is then, according to FIG. 4f, switched to the open state, so that the star point 14.3 is opened and the state shown in FIG. 4a for the winding sections 3.2 and 3.3 obtains for the winding sections 3.3 and 3.4. The actuation of the winding sections thus results in changes in impedance of about 50%, so that the substations 10A must have a correspondingly higher installed power for the state seen in FIG. 4d.

Figure 5:
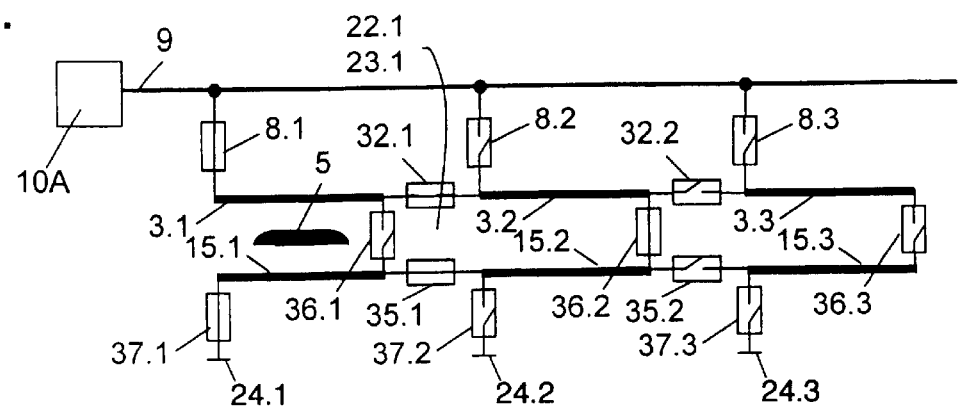
Figure 5:
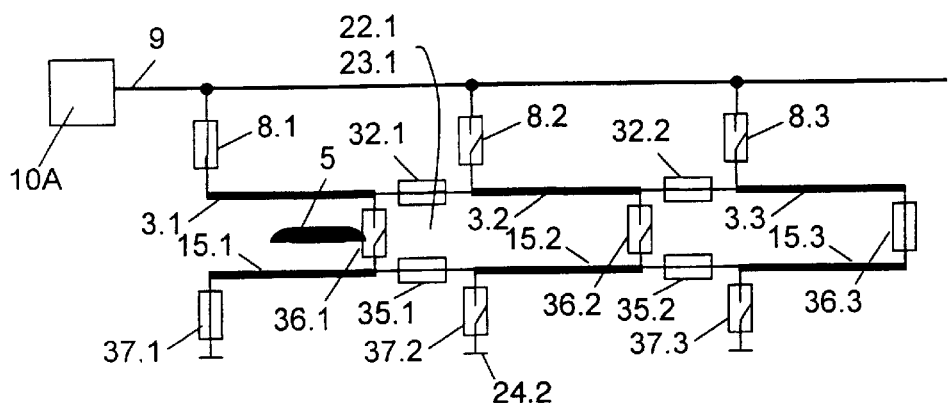
Figure 5:
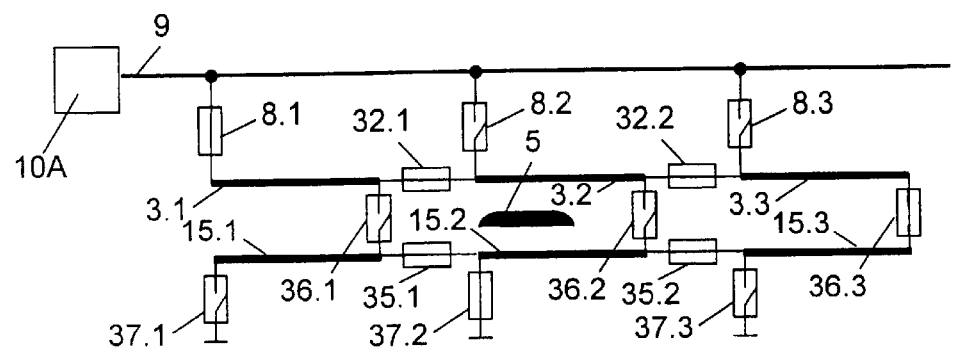
Figure 5:
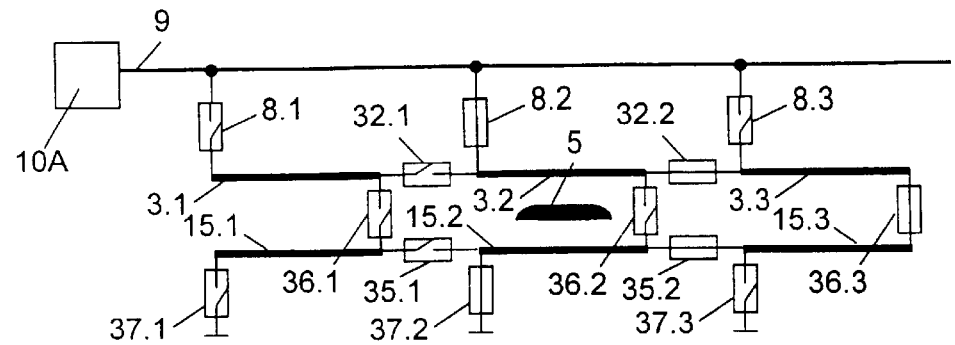

FIG. 5 shows an embodiment in which a plurality of winding sections 3.1 to 3.3 and 15.1 to 15.3 of two long stator windings arranged side byside are supplied with current by means of one track cable 9 and one substation 10A, and for the rest similar to FIG. 2.

In the embodiment according to FIG. 5 there are, in addition to the switching devices 8.1 to 8.3 and 32.1 to 32.3, second switching devices 35.1 and 35.2 corresponding to the switching devices 32, for connecting the winding sections 15.1 to 15.3 etc., as well as fourth switching devices 36.1, 36.2, by means of each of which two winding sections 3.1, 15.1 and 3.2, 15.2, etc. lying alongside one another and associated in pairs can be connected together, these connections being effected at the front ends of the winding sections in relation to the direction of travel x. The switching device 36 can therefore be interpreted as series switches. The switching devices 16 and 33 as well as the associated star point 14 (FIGS. 3, 4) are omitted. Instead of these third switching devices 37.1, 37.2, etc. are provided, being connected between the winding sections 15.1, etc. and the corresponding star points 24.1, etc, which are connected at the ends of the winding sections 15.1, etc. at the rear ends in the direction of travel x.

As FIG. 5a shows, the vehicle 5 has its left and right motor halves in the winding sections 3.1 and 15.1 alongside one another. The switching devices 8.1, 32.1, 36.2, 35.1 and 37.1 are closed and the other switching devices are open. The current from the substation 10A therefore flows in sequence through the first switching device 8.1, the winding section 3.1 connected thereto and then the switching device 32.1—bridging the changeover point 22.1—and the winding section 3.2, the switching device 36.2 and winding section 15.2. The changeover point 23.1 is then bridged by the switching device 35.1 and the current flow finally through the winding section 15.1 and the switching device 37.1 to the star point 24.1. As in FIGS. 3 and 4 two winding section arranged one after the other are thus connected electrically in series after one another, namely 3.1, 3.2 on the one hand and 15.2, 15.1 on the other hand, while the two series circuits 3.1, 3.2 and 15.2, 15.1 alongside one another are moreover connected electrically in series by the switching device 36.2.

When the vehicle 5 subsequently approaches the changeover points 22.1, 23.1, the switching device 36.2 is opened while the switching devices 32.2, 35.2 and 36.3 are closed, so that three winding sections arranged one after the other, 3.1 to 3.3 and 15.3 to 15.1 are, as in FIG. 3, connected electrically in series and the two series circuits alongside one another are additionally connected in series by the switch device 36.3. When the vehicle 5 has passed the changeover points 22.1, 23.1 (FIG. 5c) on the one hand the switching device 37.1 is opened and the switching device 37.2 is closed, in order to open the star point 24.1 and close the star point 24.2. On the other hand the switching device 8.2 is closed and the second switching devices 8.1, 32.1 and 35.1 are opened (FIG. 5d) in order to isolate the winding sections 3.1, 15.1 from the series circuits. The final state reached by the winding sections 3.2, 3.3 and 15.2, 15.3 corresponds to the initial state for the winding sections 3.1, 3.2 and 15.1, 15.2 seen in FIG. 5a. Moreover, as in FIG. 3, there are in each case two or three winding sections per motor side connected in a series circuit. If, as is not shown specifically in FIG. 5, the changeover points are offset by at least one vehicle length in the x-direction (alternate step method) the fall in propulsive force caused by the impedance change amounts at the most to 16.7%. In this example also corresponding switching devices are provided for the other two phases.

Figure 6:
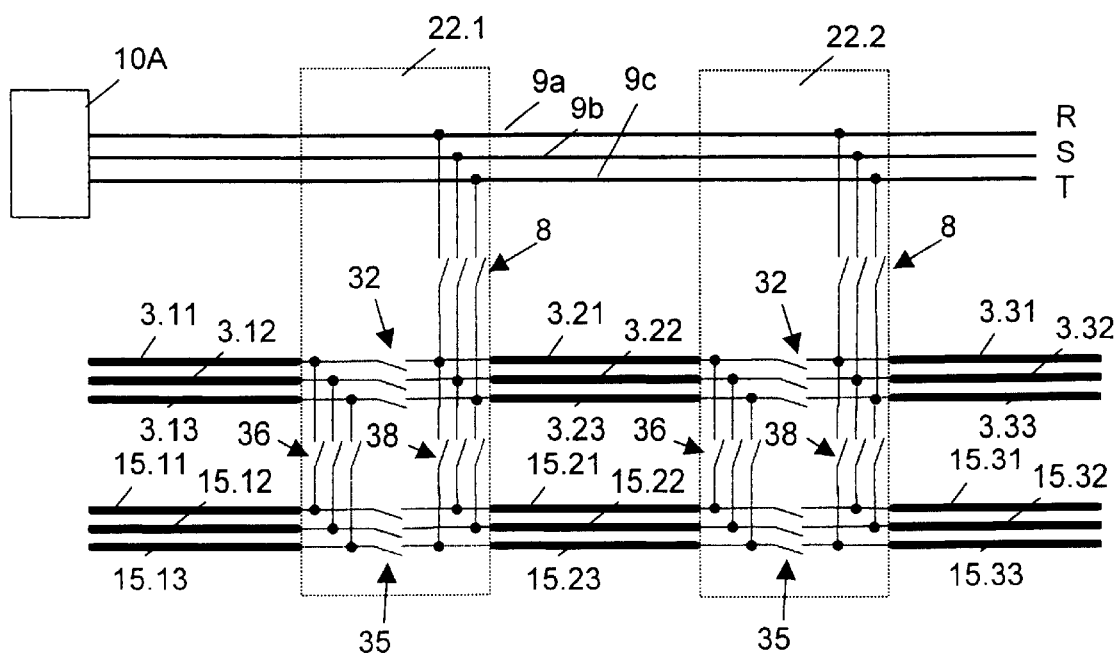
Figure 7:
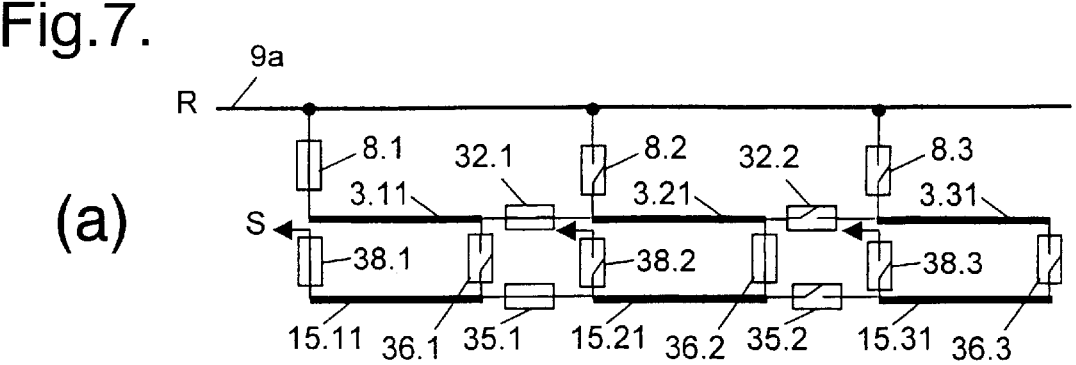
Figure 7:
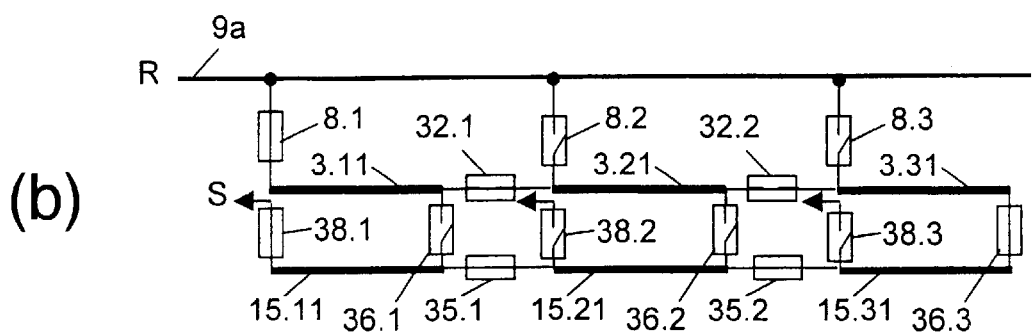
Figure 7:
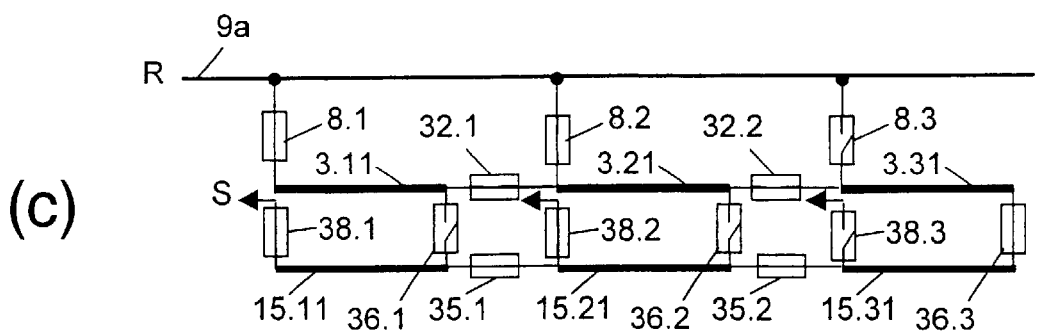
Figure 7:
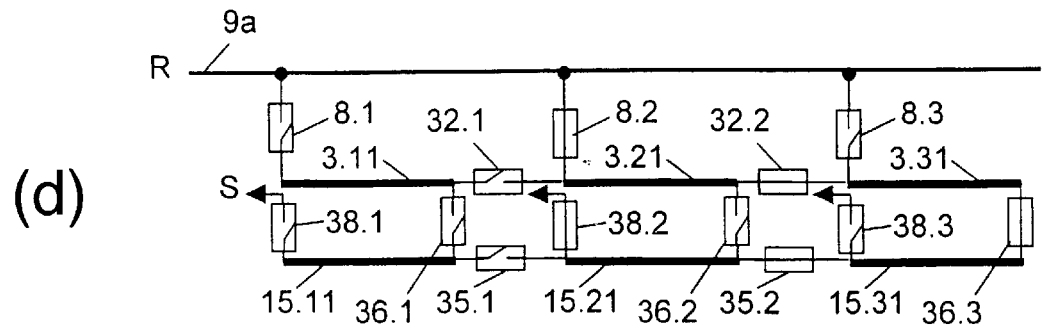

A further embodiment of the invention appears in FIGS. 6 and 7, according to which the winding sections are arranged not in a star circuit but in a polyphase delta circuit. Accordingly there are provided—as is shown only in FIG. 6 for all three phases—three track cables 9a, 9b and 9c for the phases R, S and T and correspondingly three left and right winding sections 3.11 (R), 3.12 (S), 3.13 (T) etc. and 15.11 (R), 15.12 (S) and 15.13 (T) for the two motor sides. Moreover two changeover points 22.1 and 22.2 are indicated schematically in FIG. 6, with each of which are associated, like in FIG. 3, a first switching device R, a second switching device 32 and 35 respectively for the left and right winding sections, a fourth switching device 36 for connecting two winding sections lying alongside one another and a fifth switching device 38 each, which can be called delta switches. All switching devices are here preferably in the form of three-pole, simultaneously acting switches. If in this embodiment current is to be fed for example into the winding sections 3.21 to 3.23 and 15.21 to 15.23, it is necessary to close the switching devices 8 and 38 in the changeover point 22.1 and the switching devices 36 in the changeover point 22.2 and to place all other switching devices in the open state. Accordingly the track cable 9a is connected to the start of the winding section 3.22 through the closed switching device 8, the winding section 3.21, the closed switching device 36, the winding section 15.21 and the closed switching device 38 (connection of the phases R and S). Correspondingly the track cable 9b is connected to the start of the winding section 3.23 (connection of the phases S and T) and the track cable 9c to the start of the winding section 3.21 (connection of phases T and R), as is characteristic of delta circuits.

FIGS. 7a to 7d show the progressive switching of the winding sections in accordance with the invention, using the delta circuit according to FIG. 6, where only one phase is shown with the track cable 9a (phase R) and the winding sections 3.11 to 3.31 and 15.11 to 15.31. As in FIG. 3 the switching devices 8, 32, 35, 36 and 38 are so actuated that in an initial state seen in FIG. 7a two winding sections 3.11, 3.21 and 15.11, 15.21 lying one after the other are connected in series circuit, where the switching device 36.2 simultaneously connected the two series circuits lying alongside one another of the left and right motor halves and the switching device 38.1 connects the track cable 9a (phase R) to the schematically indicated phase S, like in FIG. 6. On approach of the vehicle, not shown, to the next changeover point between the winding sections 3.11, 3.21 or 15.11, 15.21 the respective third winding sections 3.31 and 15.31 are incorporated in this series circuit. FIG. 7c shows that the switching device 8.2 is now switched on and accordingly the track cable 9a is connected in parallel with the winding sections 3.11, 15.11 like in FIG. 3e. The state illustrated in FIG. 7d then again produces the conditions analogous to FIG. 7a for the series switching of the winding sections 3.21, 3.31 and 15.21, 15.31.

Figure 8:
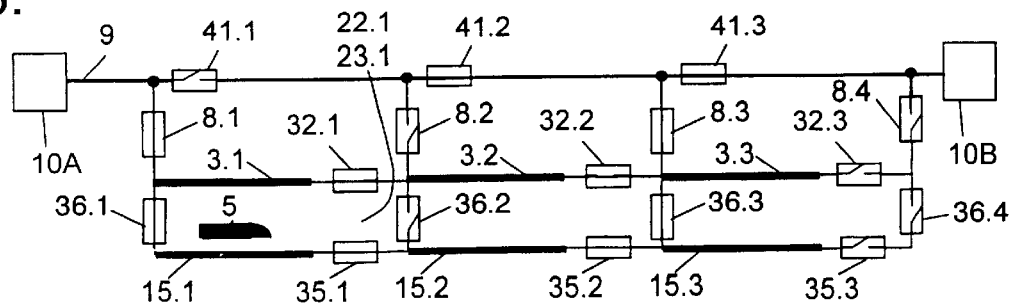
Figure 8:
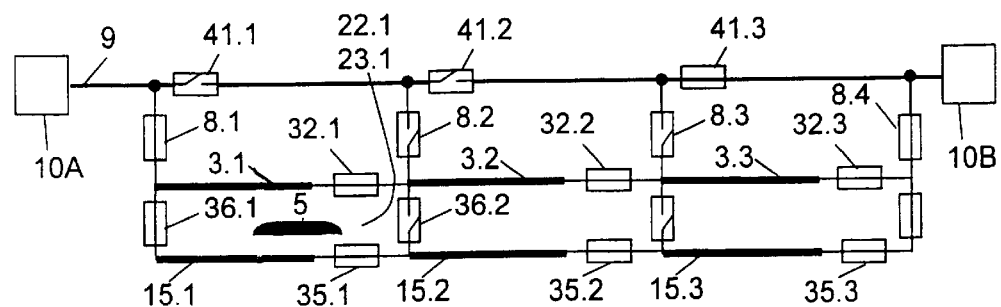
Figure 8:
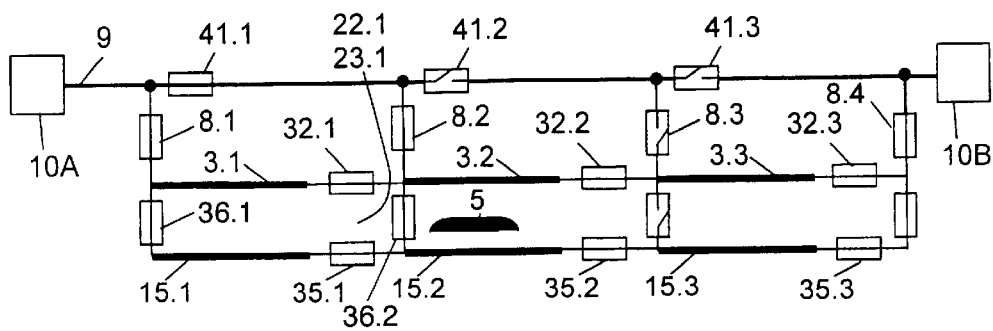
Figure 8:
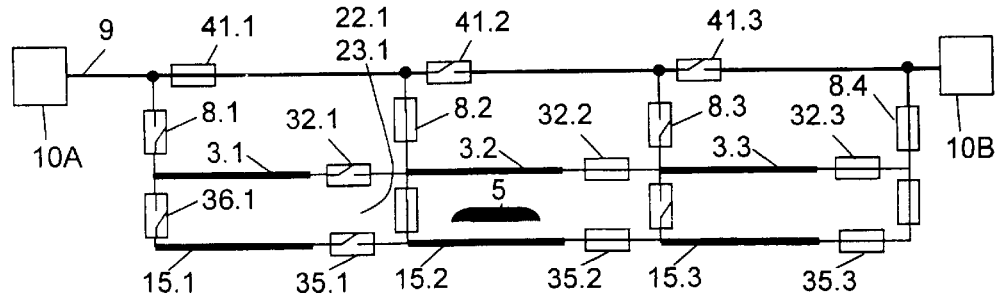

Finally FIG. 8 shows a so-called open star circuit with winding sections for one phase operated in parallel. In this example substations 10A and 10B respectively are arranged at the two ends of the track cable 9 and the track cable 9 itself is divided into individual sections by additional switching devices 41.1 to 41.3. Like in FIGS. 3 to 7 the switching device 41.1 is in the open state in an initial state (FIG. 8a), while all switching devices 41.2, 41.3, etc. preceding in the direction of travel x are closed. The current is moreover fed from the substation 10A in parallel into the series connected circuits of the winding sections 3.1, 3.2 and 15.1, 15.2, because the fourth switching devices 36 here connect together the ends at the rear in the direction of travel x of the winding sections 3.1, 15.1 and 3.3, 15.2, etc. At the ends of these series circuits the current is fed to a star point located in the substation 10B through the switching devices 8.3 and 41.3. Alternatively the star point could equally be formed in the substation 10A, in which case the end of the track cable 9 on the right in FIG. 8 would have to be fed back to the substation 10A. Moreover the states according to FIGS. 8b, 8c and 8d result from the represented states from the settings of the switching devices like in FIGS. 3 to 7.

Yet another embodiment could provide an open star circuit in a manner such that the two series circuits lying alongside one another of the left and right winding sections are operated as in FIG. 5 in series connection, rather than in parallel as in FIG. 8.

The variant seen in FIG. 8 can be extended in that each track cable section is provided with two switching devices instead of only one switching device 41.1 to 41.3, these switching devices preferably being provided at the start and at the end of each track cable section. In this case it is possible to bypass a defective track cable section with the aid of the other described switching devices, so that a slight fall in propulsive force only has to be taken into account in the region between the two associated changeover points.

The same effect can be achieved if two track cables are provided and these are connected together at each changeover point be further switching devices. Such a solution contributes the additional advantage that half the power can be fed over each of the two track cables, so that even in the event of dropout of a complete cable, there is no complete dropout of the associated motor part. Finally defective winding sections can also be rendered largely ineffective with the aid of the described switching devices, in that they are bypassed by suitable setting of the switching devices during the described progressions.

The described embodiments on the one hand assume that a sufficient voltage reserve is available for maintaining the nominal current on changing over from one to two or from two to three winding sections. On the other hand, on switching out a winding section it is necessary to prevent a critical current limit being overstepped on account of the reduction in impedance, e.g. as a result of current regulators which respond too slowly, since this could lead to damage to the drive motors. The invention therefore additionally provides according to FIG. 2 a circuit arrangement in the form of a voltage maintainer which is activated during the switching operations apparent from FIGS. 3 to 8. Thus the output of the usual speed or current regulator 25 feeds through a selector device 40 to the input of the associated substation 10A connected to the track cable 9. A sequence controller 41 is moreover provided and is connected on the input side to the line 27 (FIG. 2) for example, through which the current position signal of the vehicle 5 is provided and which moreover feeds an output control signal for the selector device 40 and a memory 42 which has further inputs connected to the outputs 25A to 25D of the current regulator and outputs connected to the selector device 40. This sequence controller 41 operates as follows:

During normal travel of the vehicle 5 within any winding section, the selector device 40 connects the outputs 25A to 25D of the current regulator 25 to the substations 10A, 10B 18A and 18B respectively. Shortly before the vehicle 5 runs into a changeover point, i.e. shortly before the first switching device is actuated (e.g. the switching device 32.3 in FIG. 3), the sequence controller 41 provides a control signal through which the outputs 25A to 25D concerned of the current regulator 25 are connected to the associated further inputs of the memory 42 and simultaneously the corresponding inputs of the selector device 40 are connected to the associated outputs of the memory 42. Accordingly the memory acquires the set-point value appearing at this instant at the output 25A to 25D concerned of the current regulator 25 and stores these. At the same time the memory 42 is connected through the selector device 40 to the substation 10A to 18B concerned, so that the stored set-point value is fed to this. This state remains until the vehicle 5 has passed the changeover point in question and the final state according to FIG. 3f is achieved for example. At this instant, the sequence controller 41 provides a control signal which isolates the memory 42 from the selector device 40 and instead connects the current regulator 25 directly to the substation 10A to 18B again. This provides the substantial advantage that a constant voltage is generated in the substations in the region of the changeover points and the current regulator 25 is inoperative. The impedance reductions described above cannot therefore create any undesirable current overshoots and thus motor damage. Instead a slight drop in the current takes place during an increase in impedance. The constant voltage can also be generated by other devices, e.g. by off-line computations.

The invention is not restricted to the described embodiments, which can be modified in numerous ways.

This applies in particular to the embodiments described with reference to FIGS. 3 to 8, which can be varied within wide limits, in particular in relation to the form and sequence control of the various switching devices. The switching devices consist for example of vacuum switches but other switching devices can be provided. Furthermore it could be provided to carry out method steps shown individually in FIG. 3 simultaneously, e.g. the method steps according to FIGS. 3d to 3f. However the performance of the method step according to FIG. 3e for example serves the purpose of effecting closure of the switching device 16.3 reliably before opening the switching devices 16.2 and 41.2, so that there is no inadvertent current interruption. Corresponding considerations can arise for the other method steps. In particular the third winding section 3.4 in FIG. 3c should be switched in already before the feed to the first winding section 3.2 (FIG. 3e) is bridged over and therefore too high a current is possibly created briefly in the winding section 3.3. Furthermore it will be understood that the interval of time in which the voltage maintainer represented by the memory 42 is active should be as short as possible, since normally substantially equal nominal values for the speed are only to be expected before and after the changeover points and therefore substantially equal values for the current are required. Finally it is obvious that the individual features of the invention can also be used in combinations other than those described and shown.

It will be understood that each of the elements described above, or two or more together, may also find a useful application in other types of constructions differing from the types described aove.

While the invention has been illustrated and described as embodied in a magnetic leviation (maglev) system and an operating method and apparatus therefor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed as new and desired to be protected by Letters Pant is set forth in the appended claims.

What is claimed is:

1. A method of operating a magnet vehicle (5) having a long stator linear motor, with winding section (3.1–3.9, 15.1–15.9) arranged one after the other in the direction of a track (2) and isolated electrically from one another by changeover points (22, 23), comprising the steps of connecting said winding sections (3.1–3.9, 15.1–15.9) in sequence in accordance with the progress of the magnet vehicle (5) to a single track cable (9, 12, 13, 19–21) serving for the current supply; further connecting, before said vehicle traverses a changeover point (22, 23), a first winding section (e.g. 3.2) bing connected to the single track cable (9) and a second winding section (e.g. 3.3) separated from said first winding section by the changeover point (e.g. 22.2) together in an electrical series circuit; maintaining said connection as long as said vehicle traverses said changeover point and, after the vehicle has traversed said changeover point, isolating said first winding section (3.2) electrically from said series section and connecting said second winding section (3.3) directly to said single track cable (9).

2. A method according to claim 1, wherein before, during or after said vehicle traverses the changeover point (22.2), a third winding section (e.g. 3.4) lying directly before the series circuit (e.g. 3.4) is connected in series with said series circuit.

3. Apparatus for operating a magnet vehicle (5) with a synchronous long stator linear motor including at least one long stator winding installed in a direction of a track (2) and divided into a plurality of winding sections (3.1–3.9, 15.1–15.9) following each other directly and electrically isolated from one another by changeover points (22, 23), comprising a single track cable (e.g. 9) extending in a direction (x) of the track (2) for supplying said winding sections with current, at least one substation (e.g. 10A, 10B) connected to said single track cable (9), first switching devices (8, 16) for sequential connection of the winding sections (3.1–3.9, 15.1–15.9) to said single track cable (9) in accordance with the progress of the vehicle (5), and second switching devices (32, 35) through which two winding sections (e.g. 3.1, 3.2 or 15.1, 15.2) lying directly after one another in the direction of travel (x) can be connected electrically together.

4. Apparatus according to claim 3, wherein third switching devices (33, 37) are provided through which said winding sections (e.g. 3.1–3.4) can be connected individually to a star point (e.g. 15.1–15.4).

5. Apparatus according to claim 3, wherein said long stator comprises two sections lying alongside one another and having respective winding sections (e.g. 3.1, 15.1 or 3.2, 15.2) lying alongside one another, which can be connected together by fourth switching devices (36).

6. Apparatus according to claims 3, wherein said winding section (3.1–3.9, 15.1–15.9) are connected in star connection between each two changeover points (22, 23) and at least a first, second and third switching device (8, 16; 32, 35; 33, 37) are associated with each changeover point (22, 23).

7. Apparatus according to claim 6, wherein at least two winding sections (e.g. 3.2, 15.2) are arranged between each two changeover points (22, 23) and wherein at least a first switching device (e.g. 8.2), two second switching devices (e.g. 32.1, 35.1), a third switching device (e.g. 37.2) and a fourth switching device (36.1) are associated with each of said changeover points (22, 23).

8. Apparatus according to claim 3, wherein said winding sections (e.g. 3.11, 3.21, 3.31) between each two changeover points (22.1, 22.2) are connected in delta circuit and wherein each changeover point (22.1, 22.2) has associated at least one first and fourth switching device (e.g. 8.2, 36.1), two second switching devices (e.g. 32.1 and 35.1) and a fifth switching device (e.g. 38.2) for connecting two phases (e.g. R and S) are associated with each of said changeover points.

9. Apparatus according to claim 3, and further comprising a circuit arrangement for maintaining the voltage or current, with a memory (42) for storing a voltage or current set-point value and a sequence controller (41) such that, during switching operations, a constant, controlled voltage is always fed to the associated substation (e.g. 10A) instead of a set-point value provided by active regulation for ensuring the desired current flow after completion of the switching operation.

10. A method of operating a magnet vehicle (5) having a long stator linear motor, with winding sections (3.1–3.9, 15.1–15.9) arranged one after the other in the direction of a track (2) and isolated electrically from one another by changeover points (22, 23), comprising the steps of connecting said winding sections (3.1–3.9, 15.1–15.9) in sequence in accordance with the progress of the magnet vehicle (5) to a track cable (9, 12, 13, 19–21) serving for the current supply; further connecting, before said vehicle traverses a changeover point (22, 23), a first winding section (e.g. 3.2) being connected to the track cable (9) and a second winding section (e.g. 3.3) separated from said first winding section by the changeover point (e.g. 22.2) together in an electrical series circuit; maintaining said connection as long as said vehicle traverses said changeover point and, after the vehicle has traversed said changeover point, isolating said first winding section (3.2) electrically from said series section and connecting said second winding section (3.3) directly to said track cable (9), wherein in the presence of two long stator sections arranged alongside one another, winding sections (e.g. 3.1, 15.1 and 3.2, 15.2) arranged in pairs and lying alongside one another are incorporated in said series circuit by series switching.

11. A method of operating a magnet vehicle (5) having a long stator linear motor, with winding sections (3.1–3.9, 15.1–15.9) arranged one after the other in the direction of a track (2) and isolated electrically from one another by changeover points (22, 23), comprising the steps of connecting said winding sections (3.1–3.9, 15.1–15.9) in sequence in accordance with the progress of the magnet vehicle (5) to a track cable (9, 12, 13, 19–21) serving for the current supply; further connecting, before said vehicle traverses a changeover point (22, 23), a first winding section (e.g. 3.2) being connected to the track cable (9) and a second winding section (e.g. 3.3) separated from said first winding section by the changeover point (e.g. 22.2) together in an electrical series circuit; maintaining said connection as long as said vehicle traverses said changeover point and, after the vehicle has traversed said changeover point, isolating said first winding section (3.2) electrically from said series section and connecting said second winding section (3.3) directly to said track cable (9), wherein in presence of two long stator sections arranged alongside one another, winding sections (e.g. 3.1, 15.1 and 3.2, 15.2) arranged in pairs and lying alongside one another are incorporated in said series circuit by parallel switching.

12. A method of operating a magnet vehicle (5) having a long stator linear motor, with winding sections (3.1–3.9, 15.1–15.9) arranged one after the other in the direction of a track (2) and isolated electrically from one another by changeover points (22, 23), comprising the steps of connecting said winding sections (3.1–3.9, 15.1–15.9) in sequence in accordance with the progress of the magnet vehicle (5) to a track cable (9, 12, 13, 19–21) serving for the current supply; further connecting, before said vehicle traverses a changeover point (22, 23), a first winding section (e.g. 3.2) being connected to the track cable (9) and a second winding section (e.g. 3.3) separated from said first winding section by the changeover point (e.g. 22.2) together in an electrical series circuit; maintaining said connection as long as said vehicle traverses said changeover point and, after the vehicle has traversed said changeover point, isolating said first winding section (3.2) electrically from said series section and connecting said second winding section (3.3) directly to said track cable (9), wherein said winding sections are combined and operated in the manner of a connection of a group containing polyphase and delta connections.

* * * * *